United States Patent [19]
Rozek

[11] Patent Number: 6,135,144
[45] Date of Patent: Oct. 24, 2000

[54] PRESSURE RELIEF VALVE ASSEMBLY

[75] Inventor: Roy J. Rozek, Plymouth, Wis.

[73] Assignee: Thomas Industries, Inc., Sheboygan, Wis.

[21] Appl. No.: 09/448,389

[22] Filed: Nov. 23, 1999

[51] Int. Cl.$^7$ .................................................. F16K 15/00
[52] U.S. Cl. ...................... 137/543.17; 137/540
[58] Field of Search ................ 137/543.17, 540

[56] References Cited

U.S. PATENT DOCUMENTS

| | | | |
|---|---|---|---|
| 2,643,915 | 6/1953 | Pieroni | 137/543.17 |
| 2,771,093 | 11/1956 | Wilson | 137/543.17 |
| 3,176,624 | 4/1965 | Sundholm | 137/543.17 |
| 3,604,450 | 9/1971 | Botkin | 137/543.17 |
| 3,961,868 | 6/1976 | Droege, Sr. et al. | 417/550 |
| 4,265,271 | 5/1981 | Rosaen et al. | 137/543.17 |
| 4,545,405 | 10/1985 | LaBelle | 137/540 |
| 4,665,943 | 5/1987 | Medvick et al. | 137/543.17 |
| 4,736,083 | 4/1988 | Saville | 219/10.55 R |
| 4,842,498 | 6/1989 | Rozek et al. | 417/571 |
| 4,889,151 | 12/1989 | Oten | 137/543.17 |
| 4,932,428 | 6/1990 | Planchard et al. | 137/540 |
| 5,082,239 | 1/1992 | Feild | 251/120 |
| 5,213,025 | 5/1993 | Rozek | 92/109 |
| 5,718,571 | 2/1998 | Rozek | 417/566 |
| 5,794,915 | 8/1998 | Shimizu et al. | 137/540 |
| 5,800,133 | 9/1998 | Ikeda et al. | 137/543.17 |
| 5,819,794 | 10/1998 | Anderson | 137/543.17 |
| 5,890,879 | 4/1999 | Rozek | 417/363 |

FOREIGN PATENT DOCUMENTS

| | | | |
|---|---|---|---|
| 364703 | 1/1932 | United Kingdom | 137/543.17 |
| 685080 | 12/1952 | United Kingdom | 137/543.17 |

Primary Examiner—Gregory L. Huson
Assistant Examiner—Joanne Y. Kim
Attorney, Agent, or Firm—Quarles & Brady LLP

[57] ABSTRACT

A pressure relief valve assembly for relieving fluid pressure in an exhaust outlet includes a deformable fluid passage in fluid communication with the exhaust outlet. The passage is blocked by a poppet disposed in the passage for discouraging fluid firm passing therethrough. A spring disposed in the passage urges the poppet against the fluid, and a knob having external buttress threads is disposed in the passage to compress the spring. The knob compresses the spring to prevent fluid below a predetermined pressure from escaping through the passage past said poppet.

14 Claims, 6 Drawing Sheets

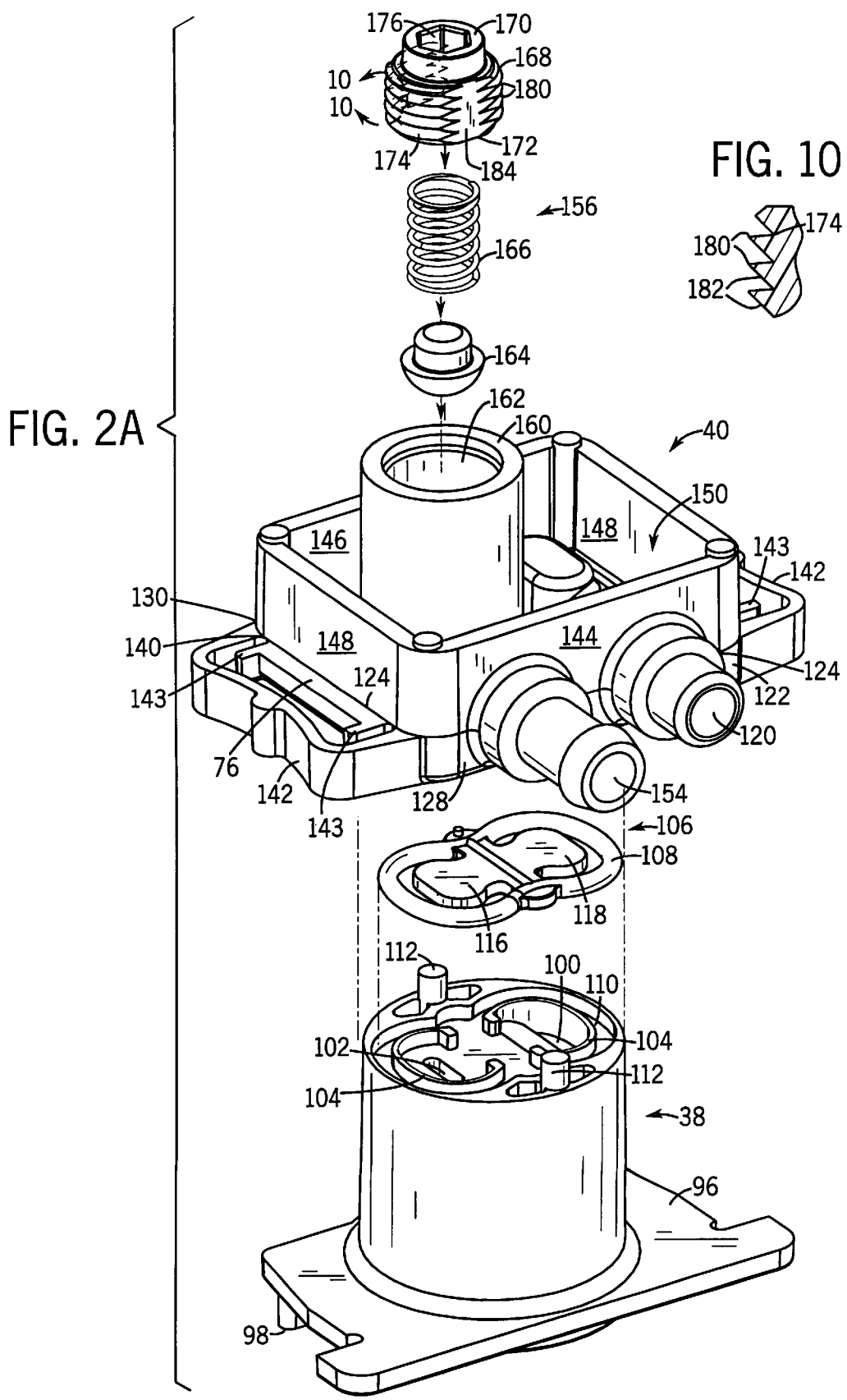

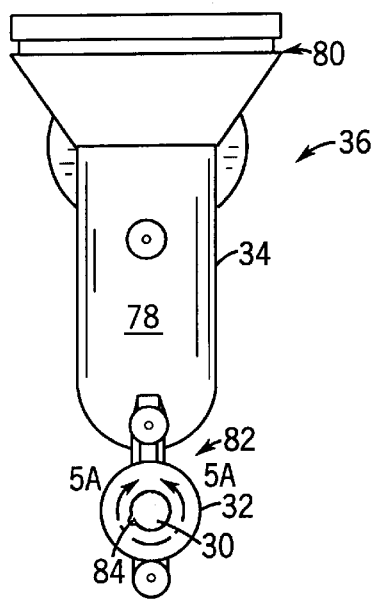
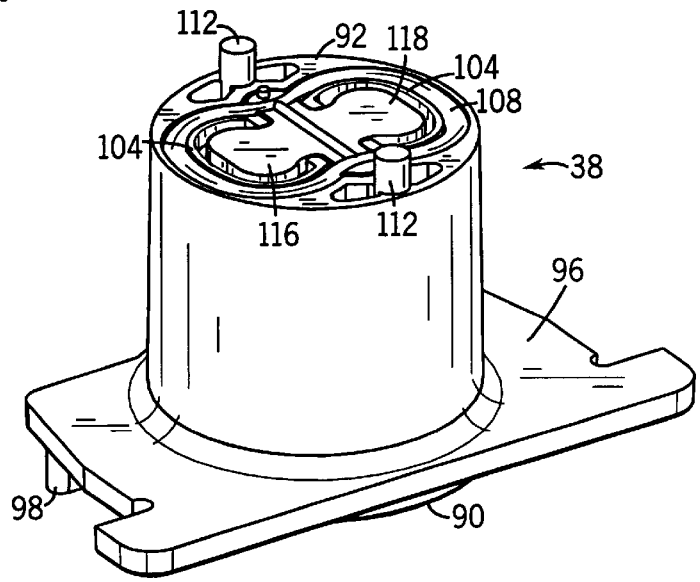
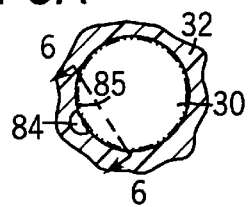
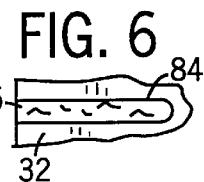
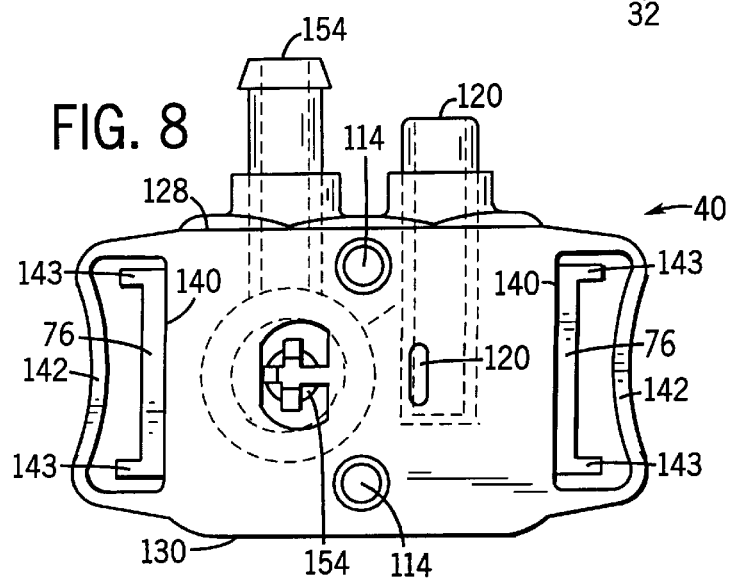

PRESSURE RELIEF VALVE ASSEMBLY

CROSS REFERENCES TO RELATED APPLICATIONS

Not Applicable

STATEMENT REGARDING FEDERALLY SPONSORED RESEARCH

Not Applicable

BACKGROUND OF THE INVENTION

This invention relates to piston pumps and compressors, and more particularly to a compressor head assembly with an integral pressure relief valve assembly.

Small-scale air compressors are often used to power nebulizers. A typical type of compressor for that purpose uses a wobble piston. Examples of such compressors are found in U.S. Pat. No. 3,961,868, issued Jun. 8, 1976 to Arthur J. Droege, Sr. et al, for "Air Compressor" and U.S. Pat. No. 4,842,498, issued Jun. 27, 1989 to Roy J. Rozek, for "Diaphragm Compressor".

In a typical compressor, a piston reciprocates in a cylinder sleeve to compress air. The piston is a plastic connecting rod having a piston end disposed in the cylinder sleeve, and a connecting end connected to an eccentric metal pin mounted to a shaft. As the shaft rotates, the connecting rod having a piston head disposed in a cylinder sleeve reciprocates to compress air. The compressed air escapes from the cylinder sleeve through an exhaust port into a valve head member.

When the exhaust outlet on the valve head member is blocked, pressure builds up in the cylinder sleeve which can cause the compressor assembly to overheat, stall, or potentially trip the motor thermal protector, failing the compressor unit. It is known to provide a pressure relief valve assembly in fluid communication with the exhaust port in order to provide a fluid passage when fluid pressure exceeds a predetermined relief setting.

These known relief valves are typically machined out of brass or similar materials to define a passage. The passage is blocked by a poppet disposed therein. The poppet is held in place by a spring compressed by a knob. The knob has conventional external threads which engage internal threads cut into the passage to compress the spring.

Providing a relief valve formed from brass is expensive. Furthermore cutting threads in the passage adds to the cost, and increases the time required to assemble the relief valve. Therefore, a need exist for a pressure relief valve assembly which is inexpensive and easily assembled.

SUMMARY OF THE INVENTION

The present invention provides a pressure relief valve assembly for relieving fluid pressure in an exhaust port. An embodiment of the invention includes a fluid passage in fluid communication with the exhaust port. The passage is blocked by a poppet disposed in the passage for discouraging fluid from passing therethrough. A spring disposed in the passage urges the poppet against the fluid, and a knob disposed in the passage for compressing the spring. The knob has external buttress threads which permit the knob to be inserted axially into the passage and thereafter adjusted in axial position by turning the knob.

The general objective of providing a pressure relief valve which can be easily assembled is accomplished by providing a knob having buttress threads. The buttress threads allow the knob to be pressed into the passage without first cutting threads into passage walls. An additional benefit of the buttress thread is that the threads provide increased resistance towards axial removal as compared to conventional threads.

Another objective of the present invention is to provide a pressure relief valve which can be easily assembled. This objected is accomplished by providing a passage which is formed from plastic, and can deform when the knob is pressed therein.

Yet another objective of the present invention is a pressure relief valve which is adjustable. This objective is accomplished by providing a knob having an engagable top which allows rotation of the knob inside the passage. Rotating the knob cuts threads in the passage and moves the knob to increase or decrease the spring compression.

The foregoing and other objects and advantages of the invention will appear from the following description. In the description, reference is made to the accompanying drawings which form a pail hereof, and in which there is shown by way of illustration a preferred embodiment of the invention.

BRIEF DESCRIPTION OF THE DRAWINGS

FIG. 2A is an exploded perspective view of the cylinder sleeve and valve head member of FIG. 2;

FIG. 5 is a front view of the wobble piston of FIG. 1;

FIG. 5A is a sectional view along line 5A—5A of the wobble piston of FIG. 5;

FIG. 6 is a sectional view along line 6—6 of the wobble piston of FIG. 5A;

FIG. 7 is a top perspective view of the cylinder sleeve of FIG. 1;

FIG. 8 is a bottom plan view of head valve member of FIG. 7;

FIG. 10 is a detailed view along line 10—10 of the relief valve knob of FIG. 2A.

DETAILED DESCRIPTION OF THE PREFERRED EMBODIMENT

Figure 1:
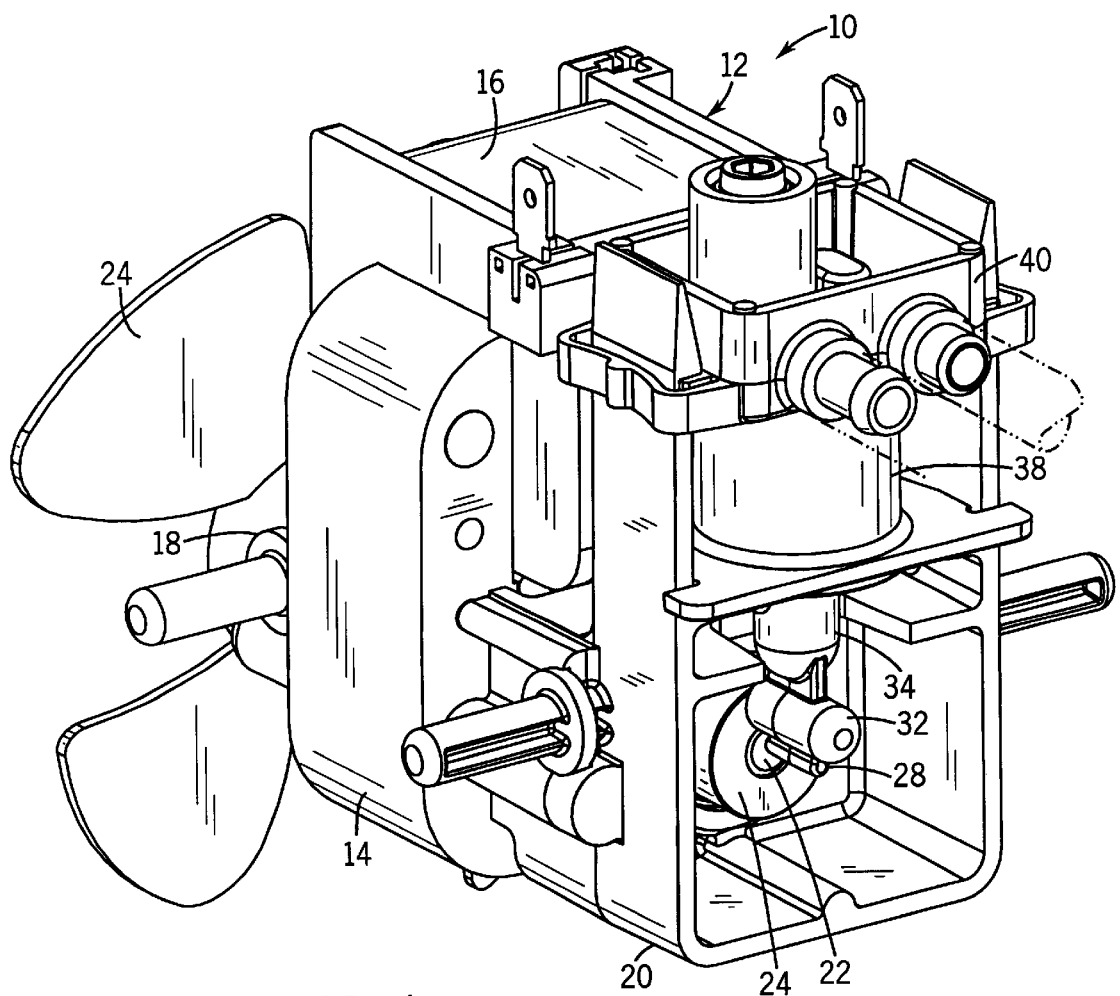
FIG. 1 is a front perspective view of a compressor assembly incorporating the present invention.

A compressor assembly 10, shown in FIGS. 1–5, includes an electric motor 12 having a laminated core 14 surrounded by a coil winding 16. Front and rear brackets 20 and 18, respectively, are attached to each other and to the laminated core 14. The brackets 20 and 18 mount bearings 60 and 61 that support a motor shaft 22. The motor shaft 22 mounts a fan 24 at one end, and an eccentric assembly 25, having an eccentric pin 28, located at the other end of the shaft. The eccentric pin 28 is journalled in a bore 30 formed in a connecting block 32 of a connecting rod 34 which forms a lower end of a wobble piston 36. Rotation of the shaft 22 drives the eccentric assembly 25, and thus the connecting rod 34, in an upwardly and downwardly reciprocating motion. The piston 36 operates in a cylinder sleeve 38 with a valve head member 40 mounted on the top of the sleeve 38. The piston 36 may be of the style and form disclosed in U.S. Pat. No. 5,213,025 issued May 25, 1993 to Roy J. Rozek, for "Conical Rod Piston".

Figure 2:
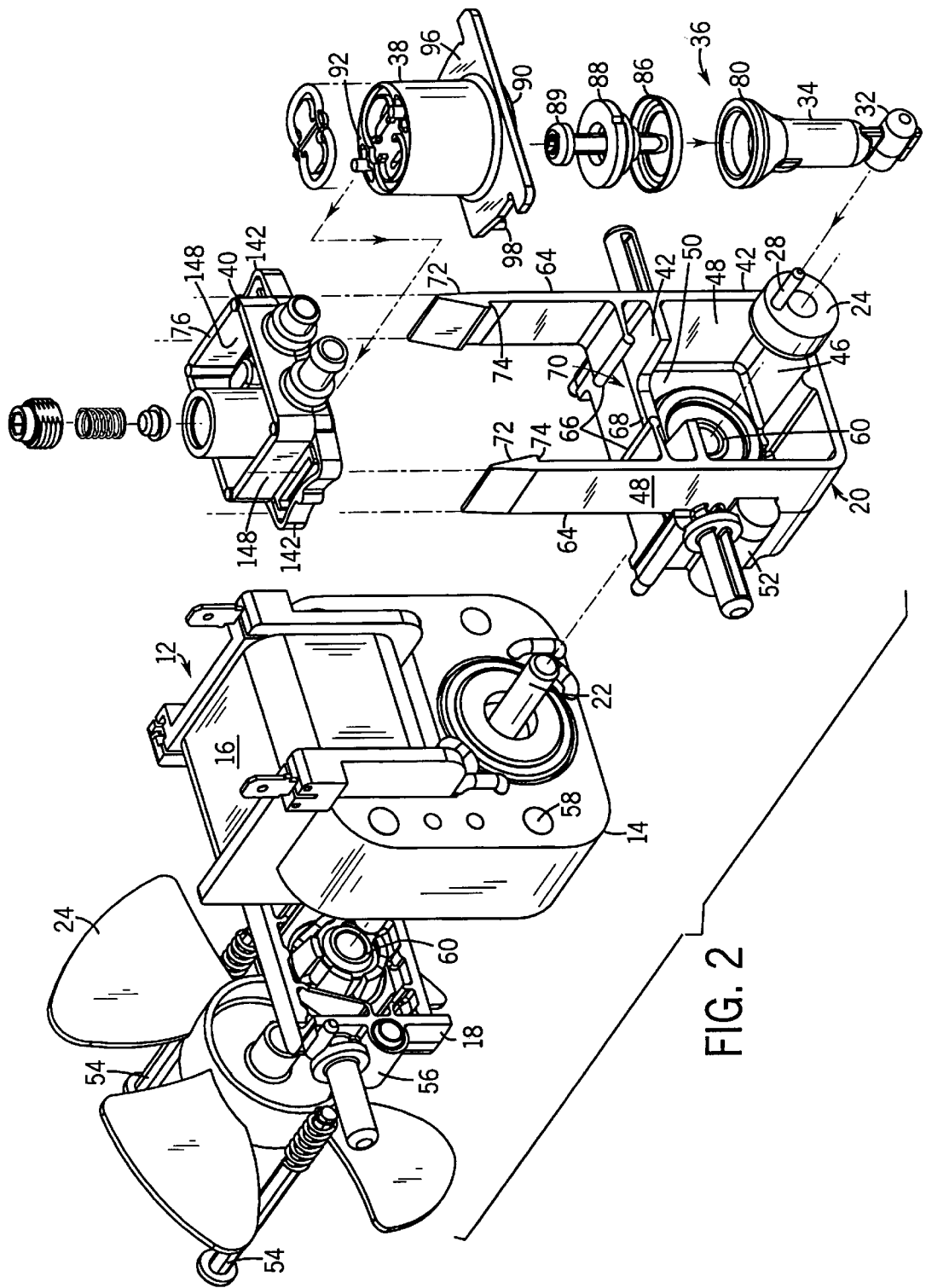
FIG. 2 is an exploded front perspective view of the compressor assembly of FIG. 1.
Figure 3:
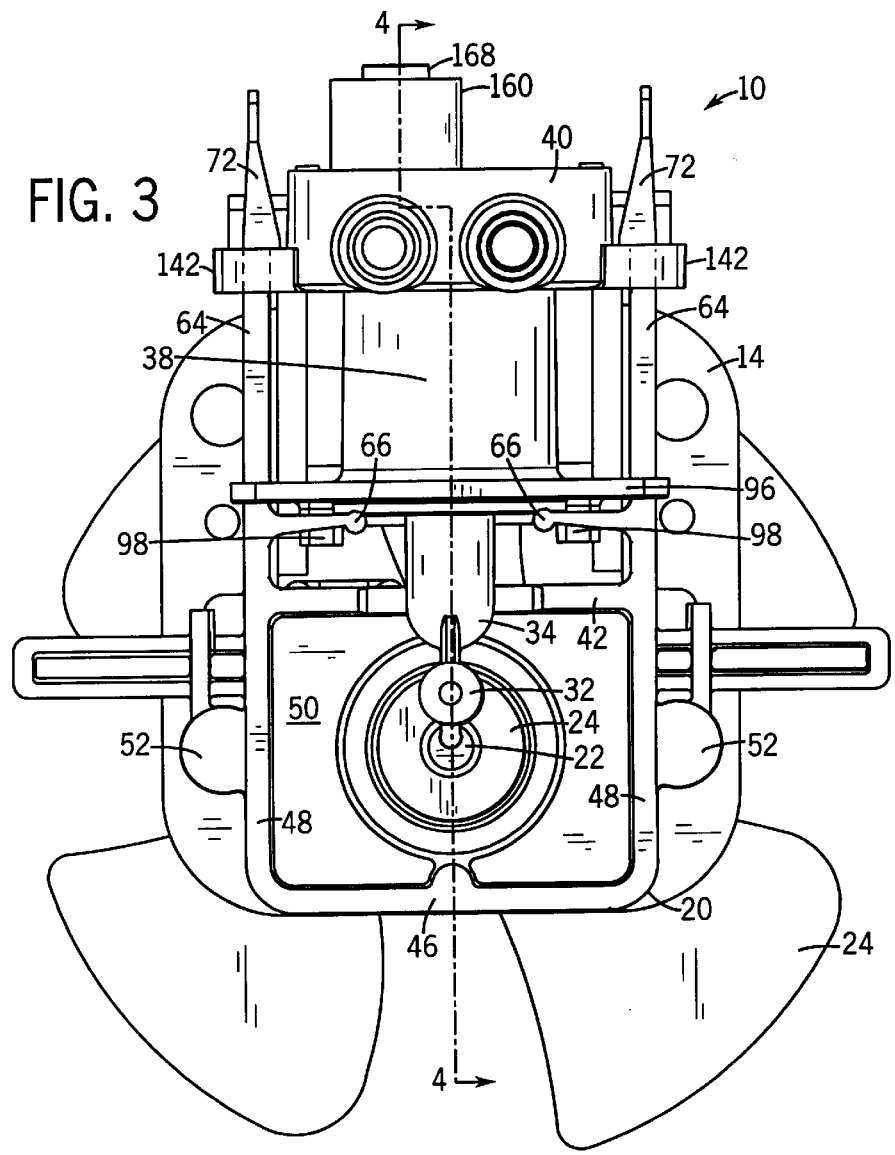
FIG. 3 is a front view of the compressor of the compressor assembly of FIG. 1.

Looking particularly at FIG. 2, the motor 12 is interposed between the front and rear brackets 20, 18 which are mounted thereto. The front bracket 20 has a rectangular base 42 with a top 44 and bottom 46 joined by opposing sides 48 and a face 50. Screw bosses 52 formed on each base side 48 abut the motor laminated core 14. Screws 54 inserted through rear bracket screw bosses 56 and holes 58 formed in the motor laminated core 14 threadably engage the front bracket screw bosses 52 to mount the brackets 20, 18 to the motor 12. A bearing 61 disposed in an aperture 62 formed in the base face 50 supports the motor shaft 22 extending therethrough.

Substantially parallel fingers 64 extend from the base sides 48 upwardly past the base top 44 to align and support the cylinder sleeve 38 and retain the valve head member 40. Shelves 66 extending inwardly from the fingers 64 above the base top 44 support and locate the cylinder sleeve 38. The connecting rod 34 extends through a notch 68 formed in the base top 44 and a gap 70 between the shelves 66 when connected to the eccentric pin 28 and disposed in the cylinder sleeve 38.

Wedges 72 formed at each upper end of the fingers 64 have engagement surfaces 74 which engage a catch 76 formed as an integral part of the valve head member 40. The wedges 72 guide the valve head member 40 between the fingers 64, and the engagement surfaces 74 retain the valve head member 40 in position above the cylinder sleeve 38. Advantageously, the wedge engagement surfaces 74 maintain the valve head member 40 in a sealed engagement with the cylinder sleeve 38. Shelves 66 are flexible members that provide a sustained force to the bottom surface 90 of sleeve 96, pushing the sleeve 96 against the valve head member 40, and subsequently against the engagement surfaces 74.

Referring now to FIGS. 5–6, the connecting rod 34 is preferably formed from a plastic material, such as nylon, and includes a generally vertically oriented rod section 78 having a connecting end 82. The connecting block 32 is formed as an integral part of the connecting end 82, and has the bore 30 formed partially through the block 32 for journalling the eccentrically mounted pin 28. Importantly, an axial groove 84 formed in the bore 30 provides an escape path for grease and air trapped in the bore 30 during assembly. Advantageously, the groove 84 also retains grease 85, or other lubricant media, to provide lubrication for the pin 28 by wiping lubricant around the pin during compressor operation.

The piston 36 is formed by providing a piston end 80 on the rod section end opposite the connecting end 82. Referring back to FIGS. 2 and 4, the frustoconical connecting rod piston end 80 reciprocates in the cylinder sleeve 38 to draw air into the cylinder sleeve 38 when moving in a downwardly direction, and to force the air out of the cylinder sleeve 38 when moving in an upwardly direction. A sliding seal 86 secured to the piston end 80 by a retainer plate 88 sealingly engages a cylindrical cylinder sleeve wall 94 as the piston end 80 reciprocates in the cylinder sleeve interior. The retainer plate 88 is secured to the piston end 80 by methods known in the art, such as ultrasonic welding, adhesives, screws, and the like. Preferably, a screw 89 threadably engaging the connecting rod 34 secures the retainer plate 88, and thus the sliding seal 86, to the piston end 80 to provide a quick and easy assembly.

Looking at FIGS. 2, 2A, and 7, the cylinder sleeve 38 has an open bottom 90 and a closed top 92 connected by the cylindrical wall 94 having an axis to define the cylinder sleeve interior. A bottom plate 96 extends radially proximal the open bottom 90. The plate 96 engages the front bracket fingers 64, and in cooperation with stops 98 extending downwardly from the bottom plate 96 which engage the shelves 66, to position the cylinder sleeve 38 beneath the valve head member 40.

The cylinder sleeve top 92 has an inlet aperture 100 and an outlet aperture 102 formed therein. A curb 104 surrounding each aperture 100, 102 positions a flapper 106 with an integral gasket 108 on the cylinder sleeve top 92. The gasket 108 is received in a groove 110 formed in the cylinder sleeve top 92 surrounding the curbs 104 and apertures 100, 102. Alignment posts 112 extending upwardly from the cylinder sleeve top 92 engage alignment holes 114 (shown best in FIG. 8) formed on the valve head member 40 to properly align the valve head member 40 with the inlet and outlet apertures 100, 102.

Figure 4:
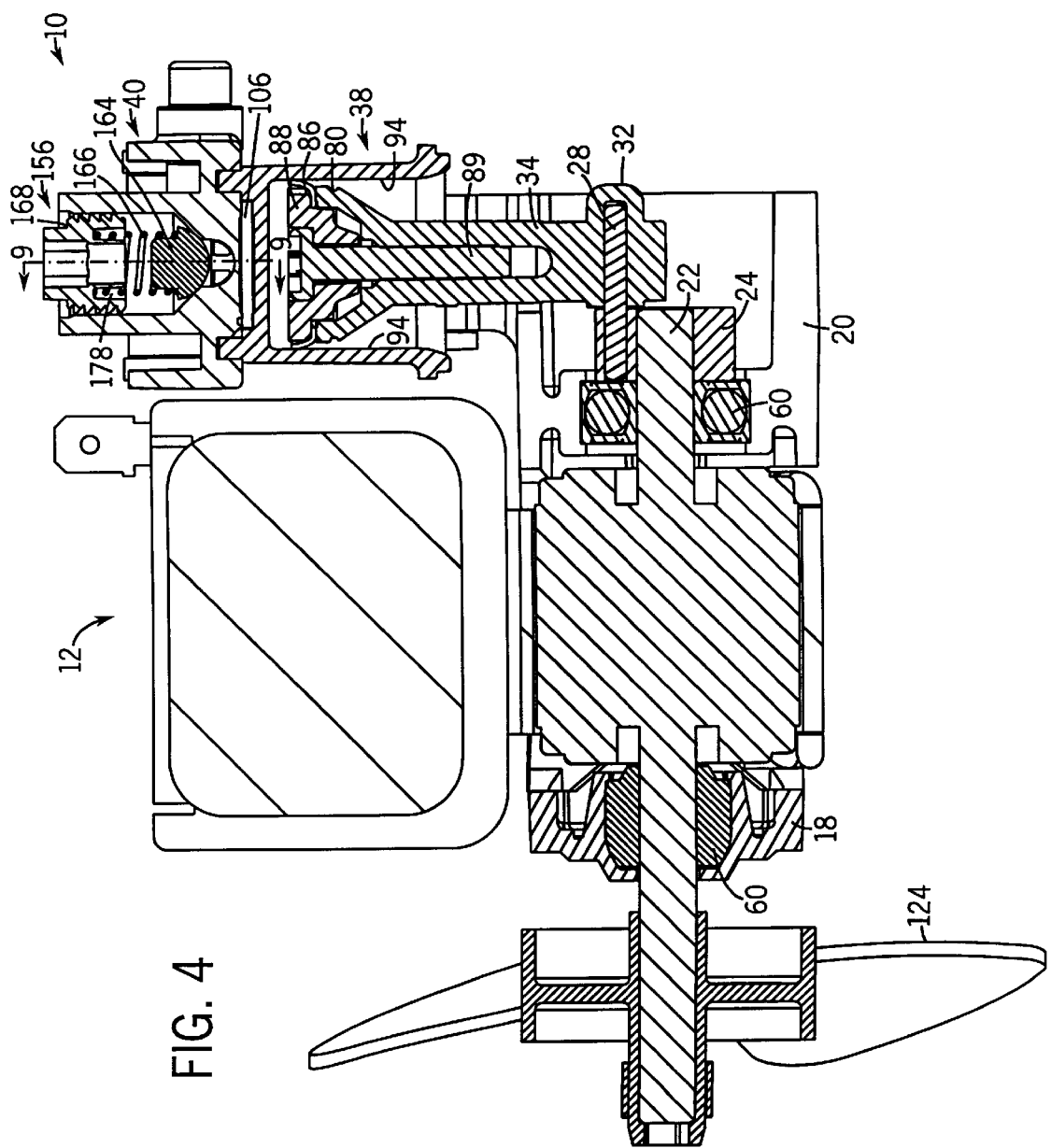
FIG. 4 is a sectional view along line 4—4 of the compressor assembly of FIG. 3.

As shown in FIGS. 2A and 4, the flexible flapper 106 is disposed between the cylinder sleeve 38 and the valve head member 40 to maintain fluid flow in the propel direction through the compressor 10. In particular, the flapper 106 prevents fluid compressed in the cylinder sleeve 38 from exiting the cylinder sleeve 38 through the inlet aperture 100, and prevents fluid from being drawn into the cylinder sleeve 38 through the cylinder sleeve outlet aperture 102. The flapper 106 has a pair of joined wings 116, 118 surrounded by the gasket 108. When the compressor 10 is assembled, each wing 116, 118 is surrounded by one of the curbs 104, and the groove 110 surrounding the apertures 100, 102 and curbs 104 receives the gasket 108.

When fluid is being drawn into the cylinder sleeve 38, the wing 116 disposed over the outlet aperture 102 is drawn against the outlet aperture 102 preventing air from passing therethrough. When fluid is forced out of the cylinder sleeve 38, the wing 118 disposed over the inlet aperture 100 is forced against an inlet port 120 in the valve head member 40 preventing fluid from passing into the valve head member inlet port 120. The gasket 108 provides a seal between the cylinder sleeve 38 and the valve head member 40 to prevent fluid from escaping from between the cylinder sleeve 38 and valve head member 40.

The valve head member 40 directs fluid flow to and from the cylinder sleeve 38. Preferably, the valve head member 40 is formed from plastic, such as glass reinforced polyethylene teraphthalate, and includes a rectangular base 122 having a top 124, bottom 126, front 128, back 130, and sides 140. Front, back and side walls 144, 146, 148 extend upwardly from the base top 124 along the base periphery defining a cavity 150. Handles 142 formed on opposing base sides 140 wrap around the front bracket fingers 64 to hold it in place. Guide extensions extending from the base sides 140 toward the handles 142 properly align the fingers 64 in the handles 142. The alignment holes 114 are formed in the base bottom 126 and receive the cylinder sleeve alignment posts 112 when assembling the compressor 10.

The inlet port 120 and an outlet port 154 formed in the valve head member 40 guide the fluid through the base 122. The inlet port 120 extends through the base front wall 144, and is in fluid communication with the inlet aperture 100 formed in the cylinder sleeve 38. The outlet port 154 also extends through the base front wall 144, and is in fluid communication with the outlet aperture 102 formed in the cylinder sleeve 38.

Figure 9:
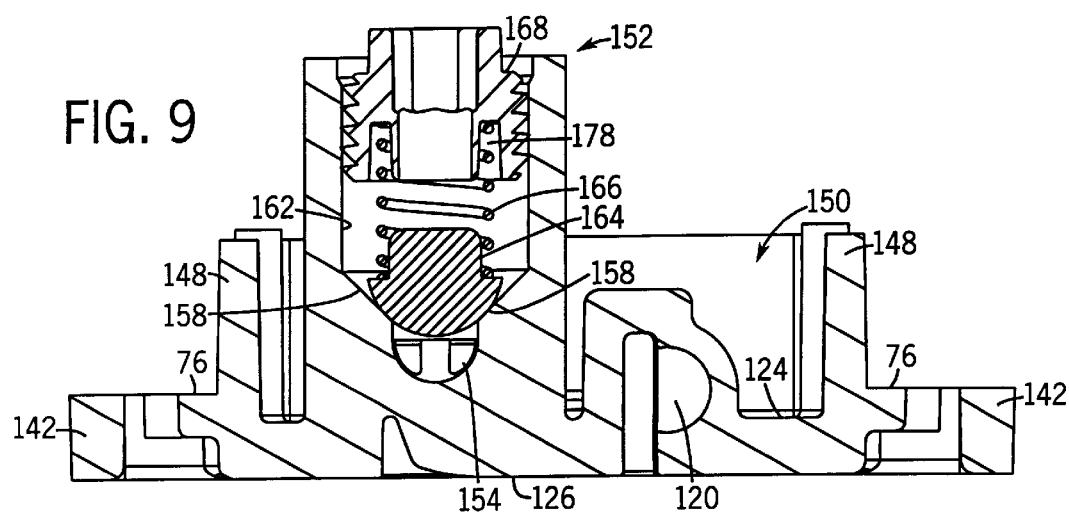
FIG. 9 is a sectional view along line 9—9 of the head valve member of FIG. 4.

Referring to FIGS. 2A and 9, a pressure relief valve 156 is formed as an integral part of the valve head member 40, and regulates the pressure of the air exiting the cylinder sleeve 38. The pressure relief valve 156 includes a boss which is integral with and extends upwardly from the base top 124. The boss includes an axial bore 162 which is in fluid communication with the outlet port 154 to provide a fluid path from the outlet port 154 to the atmosphere where the valve 156 opens. The boss is preferably formed from the same material as the valve head member which is a deformable material. A poppet 164 disposed in the bore 162 is urged against the fluid pressure in the outlet port 154 by a spring 166. The spring 166 is compressed by relief valve knob 168 disposed in the bore 162.

Looking particularly at FIG. 9, the metal relief valve knob 168 (e.g. steel, aluminum, or brass) compresses the spring 166 to urge the poppet 164 against the fluid and into a valve seat 158 extending into the outlet port 154. The poppet 164 and spring 166 prevents fluid having a pressure below a predetermined level from passing from the outlet port 154 through the bore 162. Adjusting the spring compression by moving the relief valve knob 168 closer to or further away from the poppet 164 determines the fluid pressure level which will force the poppet 164 out of the seat 158, and allow fluid to escape through the boss 160 and into the atmosphere.

Referring back to FIG. 2A, the substantially cylindrical relief valve knob 168 has a top 170, a bottom 172, an outer surface 174, and an axial through bore 176 extending from the top 170 to the bottom 172. The through bore 176 provides a path for the fluid through the pressure relief valve 156 to the atmosphere. Preferably, the knob top 170 is formed as a hex head for engagement with an Allen wrench, and the knob bottom 172 has an annular groove 178 (shown in FIG. 9) coaxial with the through bore 176 for receiving one end of the spring 166.

Referring to FIG. 10, assembly of the pressure relief valve 156 is simplified by external buttress threads 180 formed on the knob outer surface 174. The buttress threads 180 have an outer diameter slightly larger than the boss bore internal diameter to provide an interference between the threads 180 with the boss bore 162. The threads 180 are wedge shaped having an upwardly ramped surface 182 which assists in the insertion of the knob 168 into the boss bore 162 when pressed therein without threadably engaging the threads 180 with the boss 160.

Referring again to FIG. 2A, preferably, the cylindrical valve knob 168 has opposing flat areas 184 on the knob outer surface 174 which allows the boss 160 to flex during assembly while maintaining a tight interference between the threads 180 and boss 160. The flat areas 184 allow a greater latitude in the dimensional tolerances for the interfering diameters of the threads 180 and boss bore 162. The interference between the threads 180 and the boss bore 162 and the flexing of the boss provide sufficient restraining force on the knob 168 to retain the spring 166 and poppet at the desired position.

The upwardly ramped surface on knob 168 provides additional retention by aggressively pressing into the deformable walls of boss 160 when an outward force is supplied by the poppet and spring. Further adjustment of the desire pressure setting can be achieved when the knob 168 is rotated about its axis in the bore 162. Rotating the knob 168 cuts threads into the boss 160 thus providing adjustment of the knob height in the boss bore 162, and thereby controls the spring compression and desired pressure setting.

Although external buttress threads formed on the knob are preferred, conventional threads may be used without departing from the scope of the present invention. Moreover, a knob without threads may be used without departing from the scope of the invention, however, the adjustability of a nonthreaded knob may be compromised.

Looking at FIGS. 1–5, when assembling the compressor 10, the front and rear brackets 20, 18 are mounted to the motor 12 with the motor shaft 22 extending through the bearing 61 mounted in the front bracket base face 50. The eccentric assembly 24 with the eccentric pin 28 is press fit on the end of the motor shaft 22 extending through the bearing 61. The connecting rod connecting end bore 30 is filled with grease, or other lubricant known in the art, and then the pin 28 is slipped into the bore 30. The connecting rod piston end 80 is slipped into the cylinder sleeve 38, and the cylinder sleeve 38 with the flapper 106 mounted thereon is slipped between the front bracket fingers 64, and onto the shelves 66. The pressure relief knob 168 is pressed into the bore 162 formed in the pressure relief valve boss 160, and the front bracket fingers 64 are then inserted into the handles 142 of the valve head member 40. The valve head member 40 is urged toward the cylinder sleeve 38 until the wedge engagement surfaces 74 engage the valve head member top 76 to hold the valve head member 40 in sealed engagement with the cylinder sleeve 38.

While there has been shown and described what are at present considered the preferred embodiment of the invention, it will be obvious to those skilled in the art that various changes and modifications can be made therein without departing from the scope of the invention defined by the appended claims.

I claim:

1. A pressure relief valve assembly for relieving fluid pressure in an exhaust port, said assembly comprising:

a fluid passage in fluid communication with an exhaust outlet, said passage having walls and an internal unthreaded portion;

a poppet disposed in said passage for inhibiting fluid from passing through said passage;

a spring disposed in said passage for urging said poppet against the fluid; and a knob disposed in said passage unthreaded portion for compressing said spring to prevent fluid below a predetermined pressure from escaping through said passage past said poppet, said knob having external buttress threads which permit axial insertion of said knob into said passage and thereafter adjusted in axial position by turning said knob to threadably engage said threads with said passage walls, said buttress threads being characterized by a thread lower surface and upper surface, said lower surface being longer than said upper surface and defining a ramp which deforms said passage walls when said knob is inserted into said passage.

2. The pressure relief valve assembly as in claim 1, in which said passage is formed in a deformable plastic.

3. The pressure relief valve assembly as in claim 1, in which said knob has at least one flat external surface to allow deformation of said passage when said knob is pressed therein.

4. The pressure relief valve assembly as in claim 1, in which said knob includes an engagable top for rotating said knob and cutting internal threads in said passage to adjust the compression of said spring.

5. The pressure relief valve assembly as in claim 1, in which said knob includes through openings to provide a passage for compressed fluid through said knob.

6. The pressure relief valve assembly as in claim 1, in which said knob includes a groove for receiving an end of said spring.

7. A pressure relief valve assembly for relieving fluid pressure in an exhaust port, said assembly comprising:
- a fluid passage in fluid communication with an exhaust outlet, said passage being formed in a deformable material and having an internal unthreaded portion;
- a poppet disposed in said passage for inhibiting fluid from passing through said passage;
- a spring disposed in said passage for urging said poppet against the fluid; and
- a knob pressed into said passage unthreaded portion for compressing said spring to prevent fluid below a predetermined pressure from escaping through said passage past said poppet, wherein said knob is retained in said passage by an interference fit, and includes at least one flat external surface to allow deformation of said passage when said knob is pressed therein.

8. The pressure relief valve assembly as in claim 7, in which said knob has a threaded exterior.

9. The pressure relief valve assembly as in claim 8, in which said threads are buttress threads.

10. The pressure relief valve assembly as in claim 8, in which said knob includes an engagable top for rotating said knob and cutting internal threads in said passage to adjust the compression of said spring.

11. The pressure relief valve assembly as in claim 7, in which said knob has at least one flat external surface to allow deformation of said passage when said knob is pressed therein.

12. The pressure relief valve assembly as in claim 7, in which said knob includes through openings to provide a passage for compressed fluid through said knob.

13. The pressure relief valve assembly as in claim 7, in which said knob includes a groove for receiving an end of said spring.

14. The pressure relief valve assembly as in claim 7, in which said passage is formed in a deformable plastic.

* * * * *